United States Patent [19]

Saliger et al.

[11] 4,335,904
[45] * Jun. 22, 1982

[54] TOGGLE MECHANISM CONNECTOR

[75] Inventors: Kenneth C. Saliger; Martin B. Jansen, both of Houston, Tex.

[73] Assignee: NL Industries, Inc., New York, N.Y.

[*] Notice: The portion of the term of this patent subsequent to Sep. 16, 1997, has been disclaimed.

[21] Appl. No.: 183,138

[22] Filed: Sep. 2, 1980

Related U.S. Application Data

[63] Continuation of Ser. No. 916,981, Jun. 19, 1978, Pat. No. 4,222,592.

[30] Foreign Application Priority Data

Jul. 11, 1977 [GB] United Kingdom ............... 28947/77

[51] Int. Cl.³ ............................................. F16L 37/08
[52] U.S. Cl. ....................................... 285/18; 285/308; 285/DIG. 21
[58] Field of Search ................. 285/18, DIG. 21, 311, 285/24, 27, 308, 309, 310

[56] References Cited

U.S. PATENT DOCUMENTS

| | | | |
|---|---|---|---|
| 2,460,352 | 2/1949 | Jensen | 285/311 X |
| 3,321,217 | 5/1967 | Ahlstone | 285/18 |
| 3,333,870 | 8/1967 | Watkins | 285/18 |
| 3,338,596 | 8/1967 | Knox | 285/18 |
| 3,847,413 | 11/1974 | Gurley et al. | 285/DIG. 21 X |
| 3,987,741 | 10/1976 | Tryon | 285/DIG. 21 X |
| 4,057,267 | 11/1977 | Jansen, Jr. | 285/18 |
| 4,222,592 | 9/1980 | Saliger et al. | 285/18 |

Primary Examiner—Thomas F. Callaghan

[57] ABSTRACT

An over-the-center toggle mechanism for actuating locking dogs for connecting and disconnecting two underwater members. The first member includes a locking notch and the second member slideably carries locking dogs for transverse movement for engagement and disengagement with the locking notch. A toggle linkage includes a first pivot connection connected to the dogs and a second pivot connection longitudinally actuated by a piston whereby longitudinal movement of the second pivot connections transversely moves the locking dogs. A resilient load spring acts against the second pivot connections and towards said first pivot connections for locking the second pivot connections in a past dead center position relative to the first pivot connections. The second member includes a tubular body having an annular cavity with a longitudinally reciprocal carriage mounted in the cavity and actuated by the piston. The second pivot connections and the spring are transversely movable on the carriage and carried by the carriage. Preferably the cavity includes seals for sealingly enclosing the cavity and includes a flexible member exposed on one side to the interior of the cavity and on the second side to the exterior of the cavity for compensating for a difference in fluid pressure between the cavity and the outside of the body.

8 Claims, 3 Drawing Figures

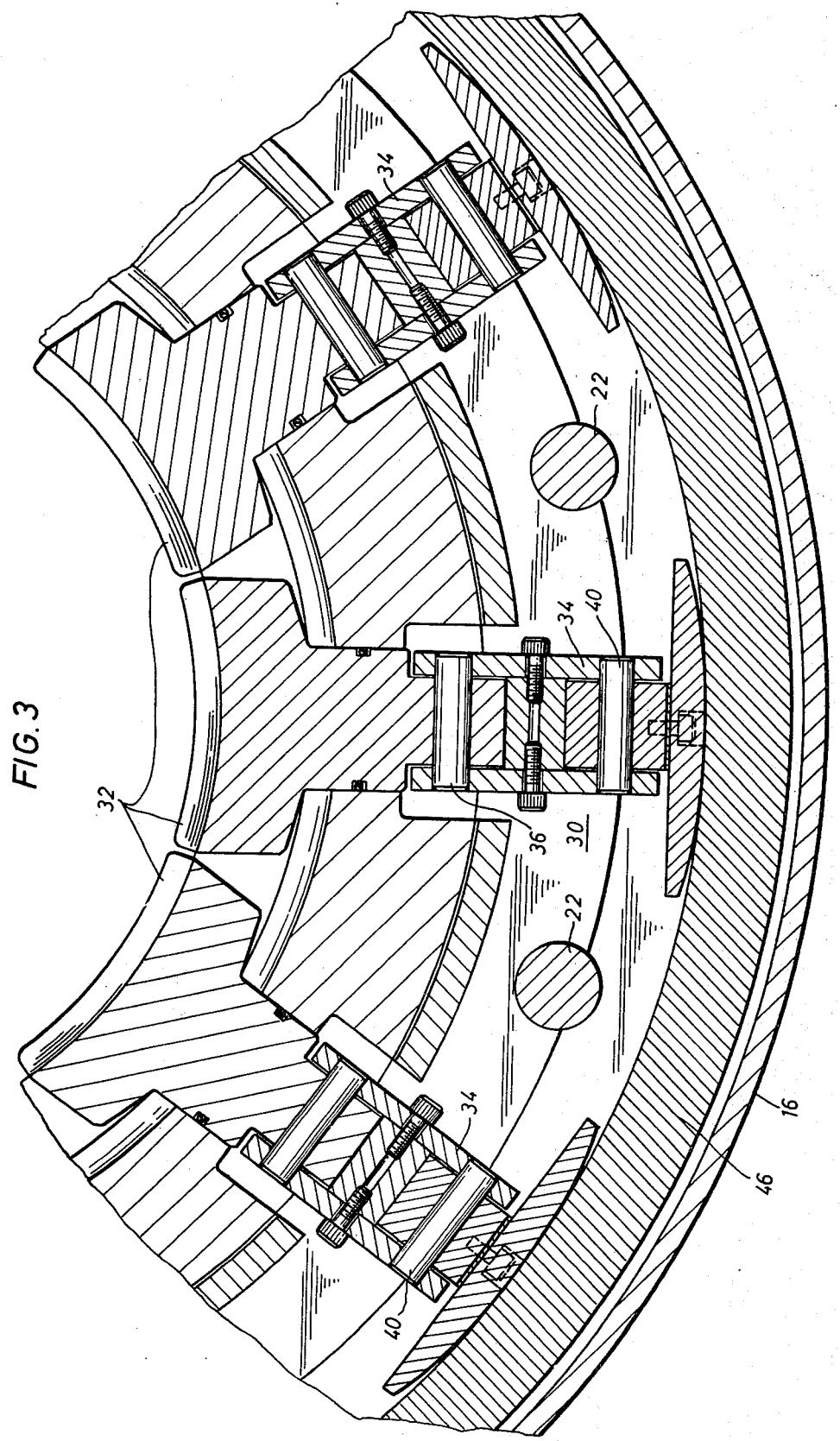

4,335,904

TOGGLE MECHANISM CONNECTOR

This is a continuation of application Ser. No. 916,981, filed June 19, 1978, now U.S. Pat. No. 4,222,592.

BACKGROUND OF THE INVENTION

Generally, it is old, as shown by U.S. Pat. No. 3,851,897, to connect and disconnect an underwater wellhead by the use of a hydraulically actuated piston moving locking dogs into a locking relationship between a connector and a wellhead.

The present invention is directed to various improvements in a connector for connecting and disconnecting two members utilizing an over-the-center toggle mechanism which provides a positive mechanical lock of the locking dogs, provides high preloads by relatively smaller actuator forces due to the high mechanical advantage of the toggle mechanism, holds the toggle mechanism in a past dead center position, and securely supports the actuating mechanism in an oil filled cavity.

SUMMARY

The present invention is directed to a connector for connecting and disconnecting two members in which the first member includes a locking notch and the second member includes a double-acting, longitudinally moving piston for moving locking dogs into and out of the notch in which the dogs are slideably carried by the second member for transverse movement toward and away from the locking notch. A toggle linkage is provided having first pivot connections connected to the dogs and second pivot connections longitudinally actuated by the piston whereby the longitudinal movement of the second pivot connections transversely moves the locking dogs.

Still a further object of the present invention is the provision of a resilient load spring acting against the second pivot connections and toward the first pivot connections for locking the second pivot connections in a past dead center position relative to the first pivot connections thereby providing a positive mechanical lock for the dogs as well as resulting in high preloads acting between the pivot and second member with a relatively small piston force due to the high mechanical advantage of the toggle linkage.

Yet a further object of the present invention is the provision of a hydraulically actuated connector in which the second body includes an annular cavity in which a longitudinally reciprocal carriage is mounted and moved by the piston and the carriage supports the second pivot connections and the spring which are transversely movable on the carriage.

A still further object is the provision of sealing means for enclosing the cavity so that it may be oil filled and a flexible member is provided exposed on one side to the interior of the cavity and on the second side to the exterior of the cavity for compensating for a difference in fluid pressure between the inside and outside of the body as well as compensating for movement of the piston and dogs into and out of the cavity.

Other and further objects, features and advantages will be apparent from the following description of a presently preferred embodiment of the invention, given for the purpose of disclosure and taken on conjunction with the accompanying drawings.

BRIEF DESCRIPTION OF THE DRAWINGS

FIG. 3 is a cross-sectional view taken along the line 3—3 of FIG. 1.

DESCRIPTION OF THE PREFERRED EMBODIMENT

Figure 1:
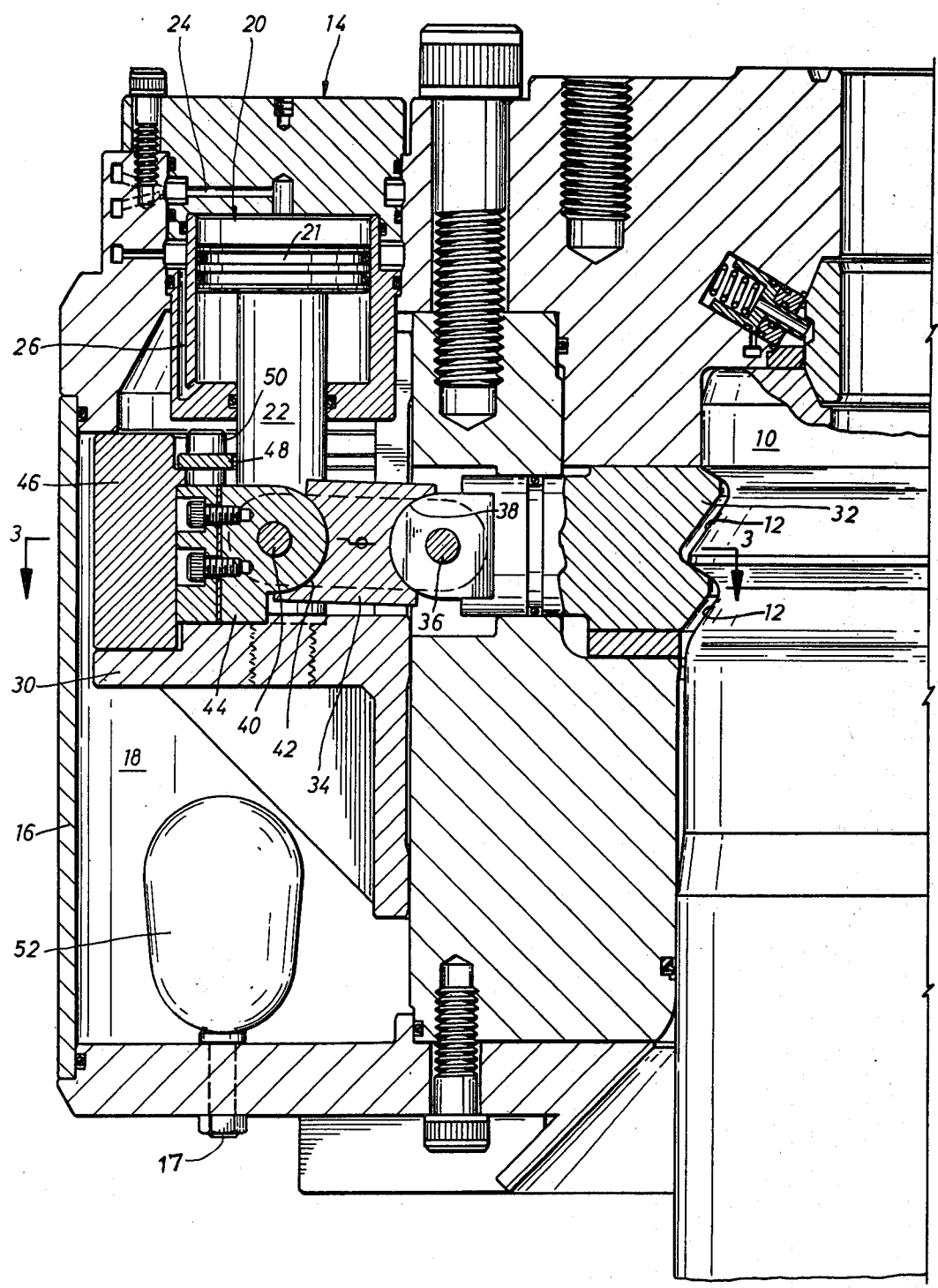
FIG. 1 is an elevational view, in quarter section, of the connector of the present invention shown in the locked position.

While the present invention is directed to a connector for connecting and disconnecting two remote underwater conductors such as a subsea blowout preventer stack or a subsea Christmas tree to a wellhead of an oil and/or gas well, the connector is also suitable for use in a remote subsea pipeline connector, flowline, marine riser connector and other applications.

Referring now to the drawings, the reference numeral 10 generally indicates a first tubular member such as the top of a wellhead having one or more annular locking notches 12 on its exterior to which a second member of connector, generally indicated by the reference numeral 14, is connected or disconnected.

The connector 14 includes a tubular body 16 having an annular cavity 18 therein. The body 16 is adapted to telescope over and seat and seal on member 10.

One or more double acting piston and cylinder assemblies 20 are provided in the body 16 each with a piston 21 having a piston rod 22 extending into the cavity 18. Hydraulic pressure line 24 supplies hydraulic pressure to one side of the pistons 21, and hydraulic pressure line 26 applies hydraulic pressure to the other side of the pistons 21. An annular carriage 30 is longitudinally movable in the cavity 18 and is connected to the piston rods 22 and longitudinally reciprocates with the pistons 21. The carriage 20 bears against the inside of the body 16 for providing a secure support.

A plurality of locking dogs 32 are provided having one end for engaging the locking notches 12 on the first member 10 and having their second ends extending through seals into the body cavity 18. The dogs 32 move transversely in the body 16 for engagement and disengagement with the locking notch 12.

A toggle linkage 34 is provided to translate the longitudinal motion of each of the piston rods 22 into a transverse movement of one of the locking dogs 32. Each toggle linkage 34 has a first pivot connection connected to one of the dogs 32 within the cavity 18. The first pivot connection may include a pin 36 as well as arcuate power-bearing surfaces 38. The second pivot connection of each of the toggle linkages 34 is longitudinally actuated by the pistons 21 whereby the longitudinal movement of the second pivot connections transversely moves the locking dogs 12. The second pivot connections may include a pin 40 and coacting arcuate power-bearing surfaces 42 between the linkage 34 and a bearing journal 44, which rest on and is carried by the carriage 30.

An annular load spring 46 is supported on the carriage 30 and acts against the second pivot connections and toward the first pivot connections for locking the second pivot connections in a past dead center position relative to the first pivot connections. The annular spring ring 46 is retained to the carriage 30 by a retainer plate 48 and hold-down bolts 50 although the spring 46 and bearing journals 44 are transversely movable on the carriage 30 so that the spring 46, which acts as a large garter spring, flexes outwardly and inwardly to allow the toggle linkages 34 to snap over dead center into a locked or unlocked position.

The cavity 18 includes seals for sealingly enclosing the cavity whereby it may be filled with oil to reduce maintenance of the operating parts and protect the operating parts from hostile subsea environment. A flexible member such as a rubber bladder 52 may be provided which has one side exposed to the interior of the cavity 18 and a second side exposed through opening 17 to the exterior of the body 16 for compensating for a difference in fluid pressure between the cavity 18 and the outside of the body 16 as well as compensating for the movements of the piston rods 22 and dogs 32 into and out of the cavity 18.

Figure 2:
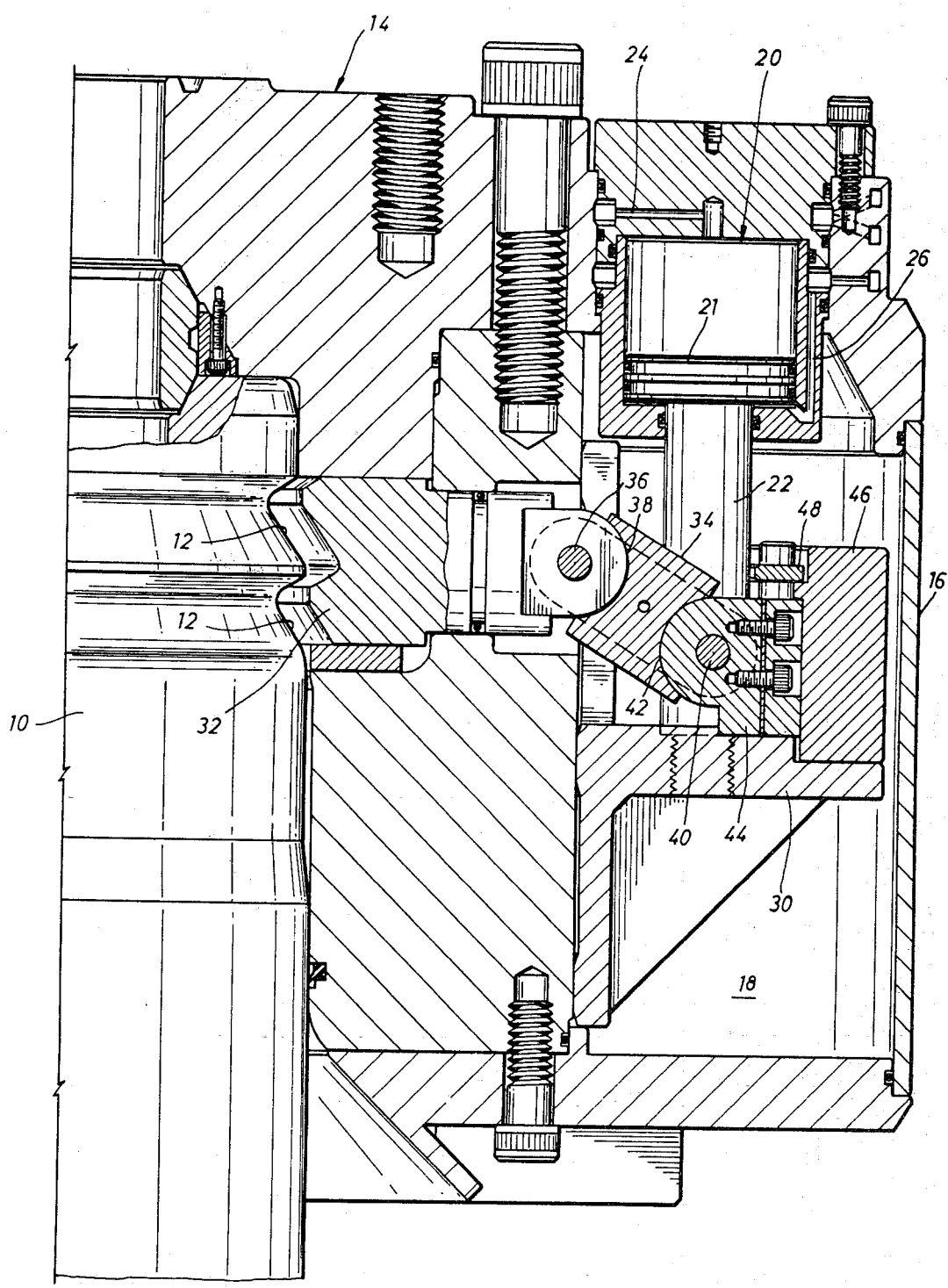
FIG. 2 is an elevational view, in quarter section, of the connector of the present invention shown in the unlocked position.

Referring to FIG. 2 with the second member 14 in position encompassing the first member 10 and in the unlocked position, hydraulic fluid is applied to the bottom side of the piston 21 through line 26 which forces the piston rods 22 and carriage 30 upwardly. The second pivot connections comprising the bearing journals 44 and pins 42 are trapped between the carriage 30 and annular load ring 46. As the second pivot connections move upwardly or longitudinally, they force the toggle linkages 34 to rotate about the first pivot connections which includes the arcuate bearing surfaces 38 and pins 36 to transversely move the locking dogs 32 into the locking notches 12 of the first member 10. Furthermore, as the angle between the centerline of the toggle linkages 34 and the centerline of the dogs 32 decreases, the ratio of the radial inward force on the dogs 32 to the vertical actuating force on the carriage 30 increases. This mechanical advantage allows a high clamping force with relatively low actuating forces. Furthermore, the load ring 46 flexes radially outward to allow the linkage 34 to snap over dead center and then inwardly as the annular ring 46 bottoms out against the body 16 to create a positive past dead center lock to hold the dogs 32 in engagement, as shown in FIG. 1.

To unlock the connector 14, hydraulic pressure is applied through line 24 moving the pistons 21, piston rods 22, and carriage 30 downwardly. The retainer plates 48 carry the load ring 46 and force the second pivot connections including the bearing journals 44 to move downwardly over dead center relative to the first pivot connections to unlock the connector 14. Further downward movement of the carriage 30 causes retraction of the dogs 32 by the pins 36 and 42.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts may be provided, without departing from the spirit of the invention and the scope of the appended claims.

What is claimed is:

1. In a connector for connecting and disconnecting two members in which the first member includes a first locking means and the second member includes a double acting longitudinally moving piston for moving a second locking means into and out of locking engagement with said first locking means, the improvement of a locking toggle mechanism comprising, said second locking means slideably carried by the second member for transverse movement toward and away from said second member for engagement and disengagement with said first locking means, and a toggle linkage having a first pivot connection connected to the second locking means and a second pivot connection longitudinally actuated by the piston whereby the longitudinal movement of the second pivot connection transversely moves said second locking means and moves the second pivot connection into a past dead center locking position.

2. The apparatus of claim 1 including, a resilient load spring acting against the second pivot connection and towards the first pivot connection for locking said second pivot connection in a past dead center position relative to said first pivot connection.

3. A connector for locking a second member to a first member which includes a first locking means comprising, said second member including an annular body having an annular cavity, second locking means slideably carried by the body for transverse movement toward and away from said second member for engagement and disengagement with the first locking means, said second locking means extending into said cavity, a toggle linkage in said cavity, which includes first and second pivot connections, said first pivot connection being connected to said second locking means;

a longitudinally reciprocative carriage mounted in the cavity, said carriage carrying said second pivot connection, an annular spring carried by the carriage and acting against said second pivot connection and towards said first pivot connection for locking said second pivot connection in a past dead center position relative to said first pivot connection, and a double acting longitudinally movable means connected to and longitudinally moving said carriage.

4. The apparatus of claim 3 including seals for sealing and enclosing said cavity, and a flexible member exposed on one side to the interior of the cavity and on the second side to the exterior of the cavity for compensating for a difference in fluid pressure between the cavity and the outside of the body.

5. The apparatus of claim 3 wherein said second pivot connections and said spring are transversely movable on said carriage.

6. A hydraulically actuated connector for locking a second member to a first member which includes a first locking means comprising, said second member including a tubular body for telescoping over the first member and including an annular sealed cavity, second locking means slideably carried by the body for transverse movement toward and away from said second member for engagement and disengagement with said first locking means, said second locking means extending into said cavity, a toggle linkage in said cavity, which includes first and second pivot connections, said first pivot connection being connected inside of the cavity to said second locking means, an annular longitudinally reciprocative carriage mounted in the cavity and bearing on its inside against the inside of the body, said carriage carrying said second pivot connection, an annular spring carried by the carriage and acting against said second pivot connection and towards said first pivot connection for locking said second pivot connection in a past dead center position relative to said first pivot connection, and a double acting longitudinally movable piston carried by the body and extending into the cavity and connected to and longitudinally moving said carriage.

7. The apparatus of claim 6 wherein said second pivot connection and said spring are transversely movable on said carriage.

8. In a connector for connecting and disconnecting two members in which the first member includes a first locking means and the second member includes two second locking means and means for moving said second locking means into and out of engagement with said first locking means, the improvement comprising, said second member including an annular body having an annular cavity, seal means enclosing said cavity, said second locking means and said means for moving said second locking means extending into said cavity, oil filling said cavity, and a flexible member exposed on one side to the interior or the cavity and on the second side to the exterior of the cavity.

* * * * *